July 28, 1970

R. F. BUSWELL ET AL 3,522,019

APPARATUS FOR GENERATING HYDROGEN FROM LIQUID
HYDROGEN-CONTAINING FEEDSTOCKS

Filed March 18, 1968

INVENTORS
RICHARD F. BUSWELL
RICHARD A. SEDERQUIST
HERBERT J. SETZER
DANIEL J. SNOPKOWSKI

BY

*ATTORNEY*

July 28, 1970   R. F. BUSWELL ET AL   3,522,019
APPARATUS FOR GENERATING HYDROGEN FROM LIQUID
HYDROGEN-CONTAINING FEEDSTOCKS
Filed March 18, 1968   8 Sheets-Sheet 5

INVENTORS
RICHARD F. BUSWELL
RICHARD A. SEDERQUIST
HERBERT J. SETZER
DANIEL J. SNOPKOWSKI
BY
ATTORNEY

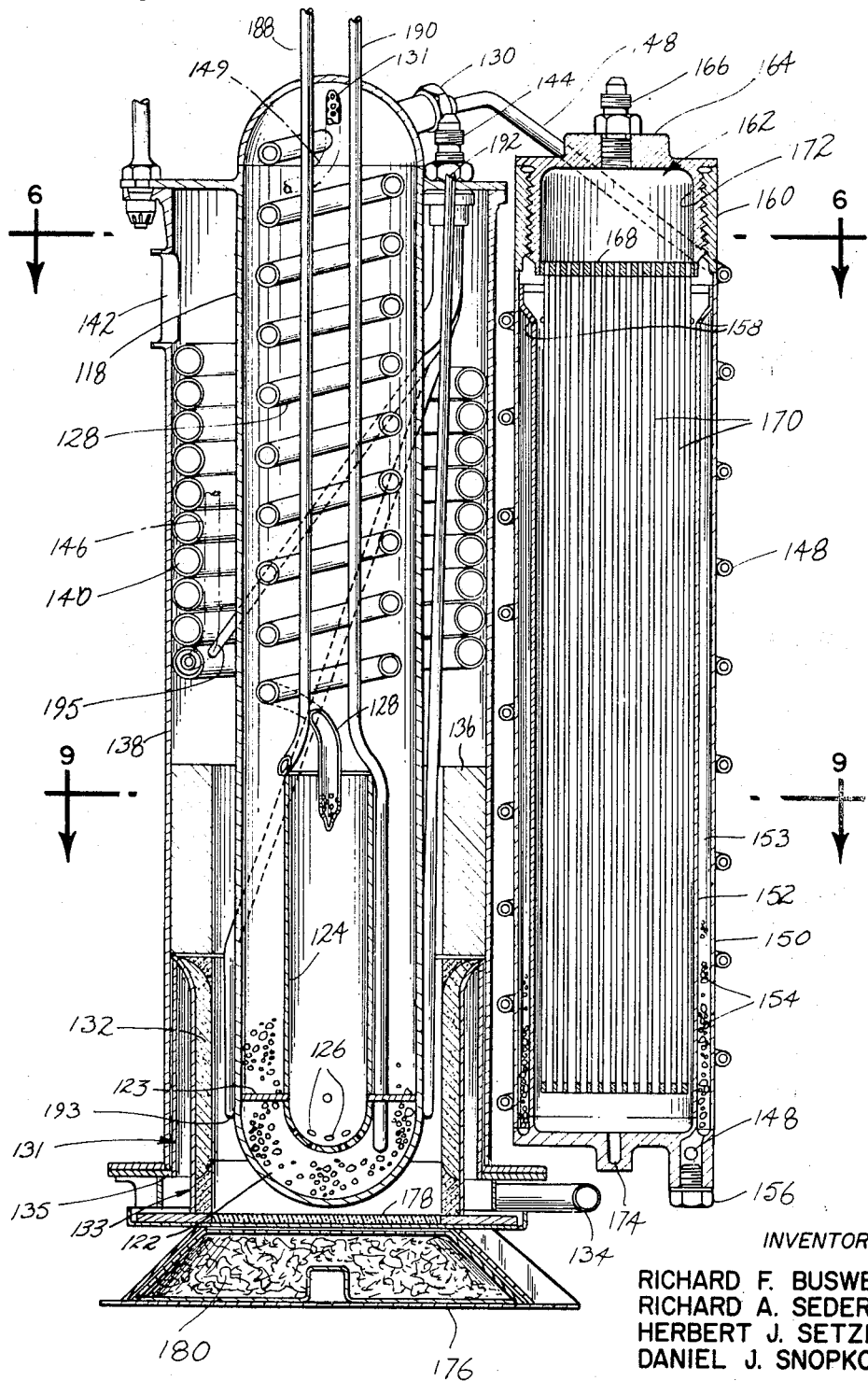

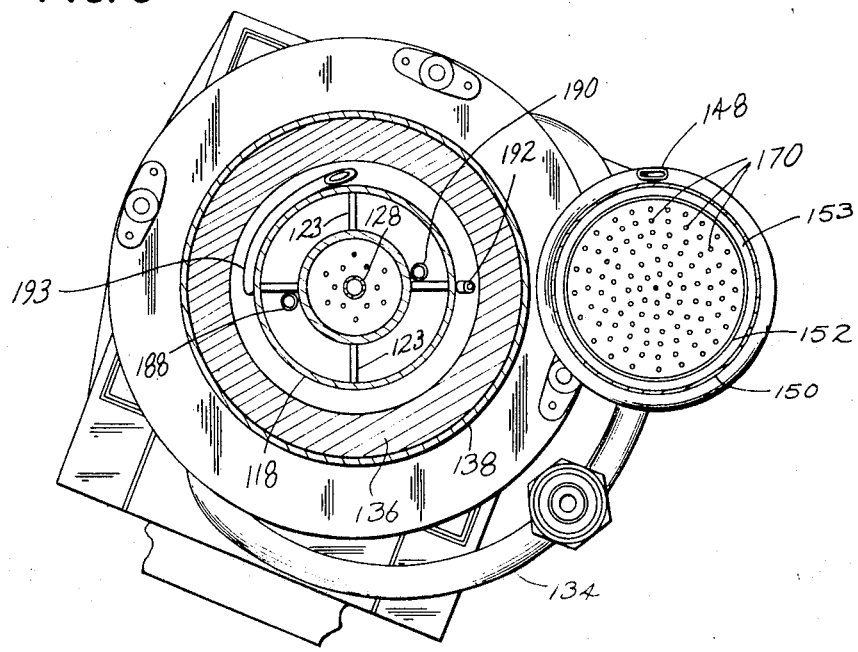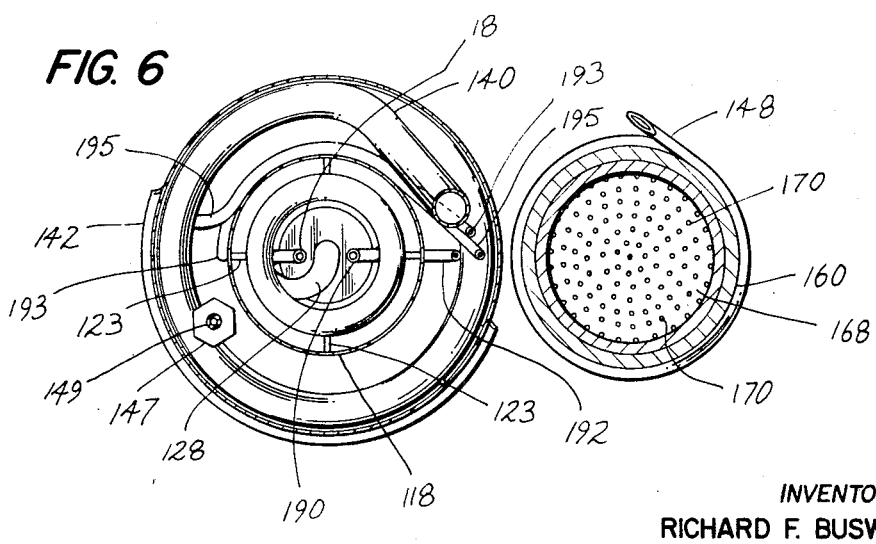

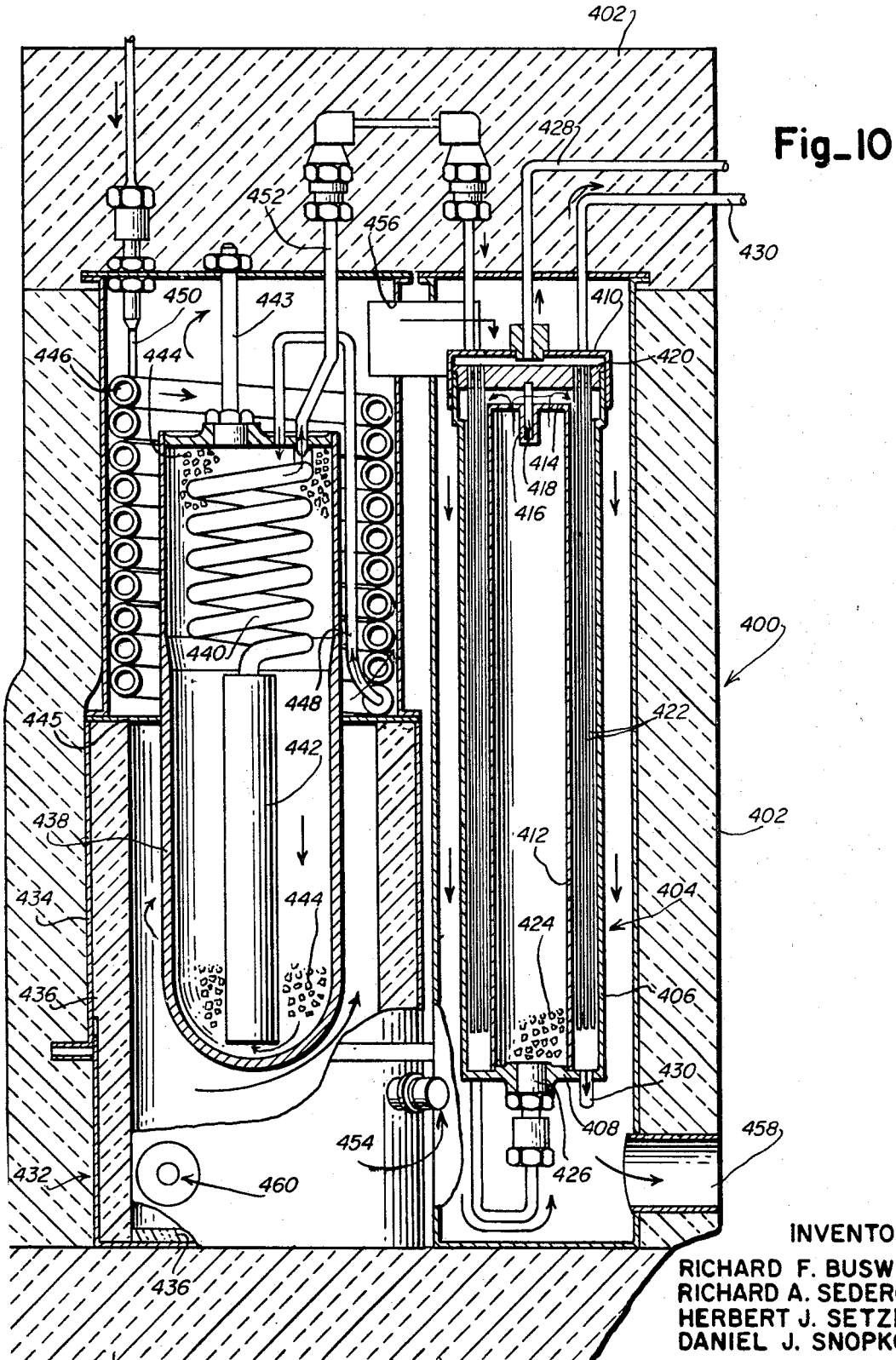

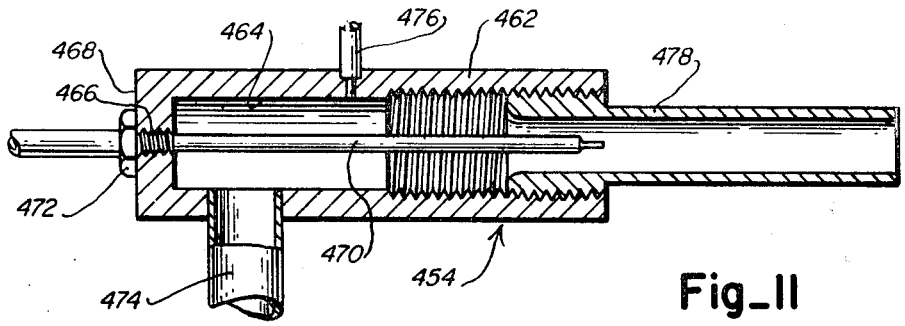
Fig_11
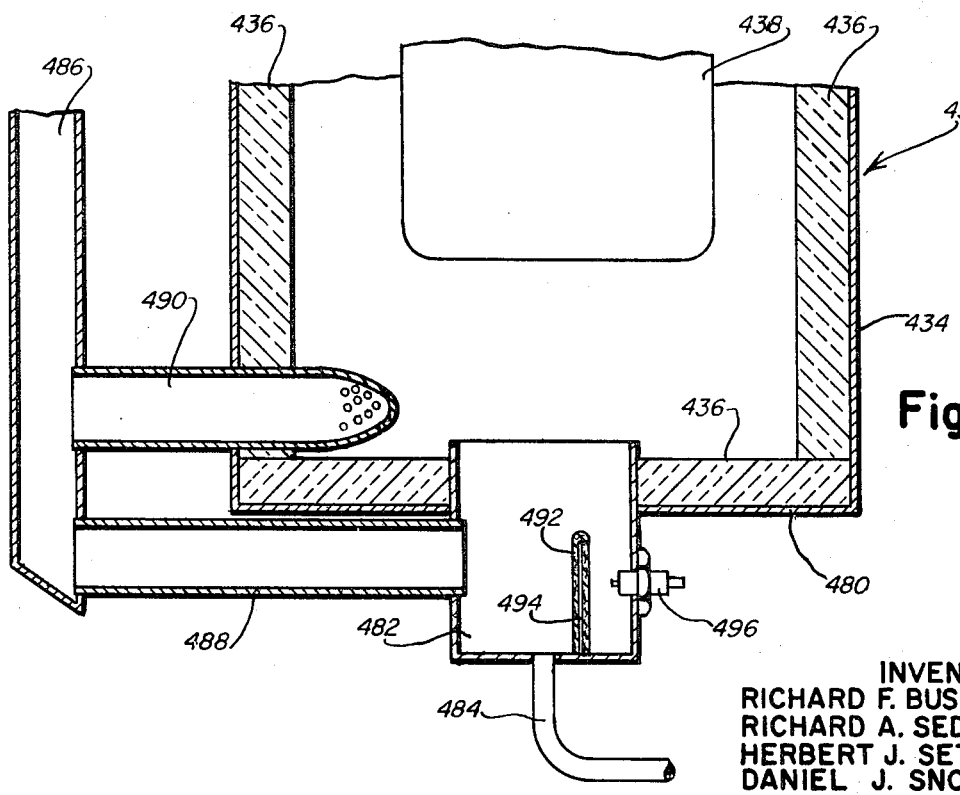
Fig_12
INVENTORS
RICHARD F. BUSWELL
RICHARD A. SEDERQUIST
HERBERT J. SETZER
DANIEL J. SNOPKOWSKI
BY
ATTORNEY

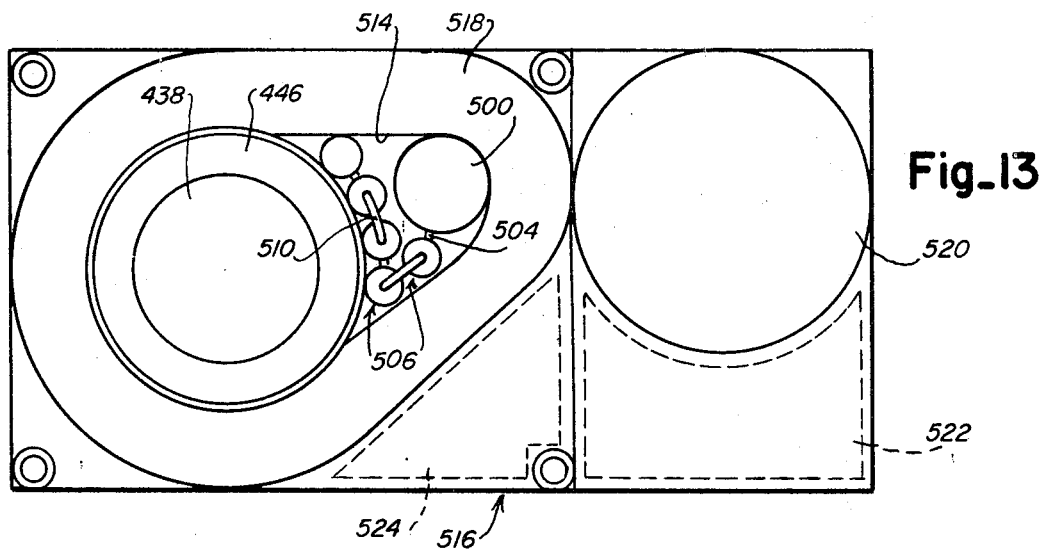
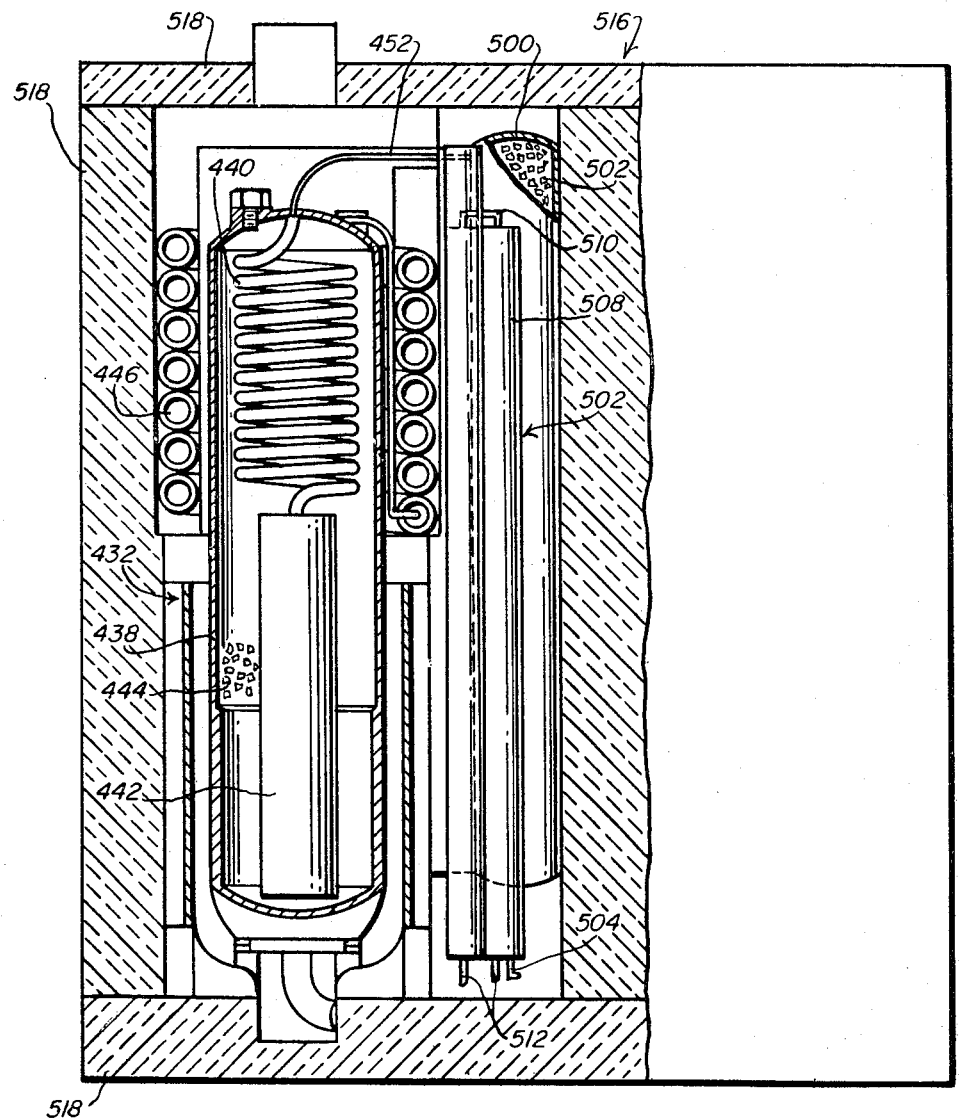

United States Patent Office 3,522,019
Patented July 28, 1970

3,522,019
APPARATUS FOR GENERATING HYDROGEN FROM LIQUID HYDROGEN - CONTAINING FEEDSTOCKS
Richard F. Buswell, Glastonbury, Richard A. Sederquist, Newington, Herbert J. Setzer, Ellington, and Daniel J. Snopkowski, West Hartford, Conn., assignors to United Aircraft Corporation, East Hartford, Conn., a corporation of Delaware
Continuation-in-part of application Ser. No. 476,906, Aug. 3, 1965. This application Mar. 18, 1968, Ser. No. 713,868
Int. Cl. B01d 53/22; B01j 7/00, 9/04
U.S. Cl. 23—288       24 Claims

ABSTRACT OF THE DISCLOSURE

An apparatus for providing substantially pure hydrogen from hydrogen-containing feedstocks wherein the feedstock first admixed with water and heated, passed through a bed of dehydrogenation catalyst to produce a methane-rich stream, and the methane-rich stream is then passed through an additional bed of dehydrogenation catalyst to effect conversion of the methane to carbon oxide products and hydrogen. The converted methane stream is passed in heat exchange relationship with the first catalyst bed countercurrent to the flow of the mixture of feedstock and water therethrough to establish a thermal decline from the outlet to the inlet end thereof and to decrease the temperature of the converted stream. Heat is supplied to a purifier containing membranes of metal selectively permeable to hydrogen by one or more of the catalytic conversion reactions to maintain the membranes at an optimum temperature. Several different heat exchange relationships for the several elements are shown.

CROSS-REFERENCE TO RELATED APPLICATIONS

This is a continuation-in-part of our copending application Ser. No. 476,906 filed Aug. 3, 1965, now U.S. Pat. No. 3,446,594, granted May 27, 1969. The present application is filed as the result of a requirement for election in the aforementioned application and contains certain additional disclosure of alternate components and arrangements within the general assembly of the apparatus disclosed and claimed in the parent application.

BACKGROUND OF THE INVENTION

Because of a desire to produce electric current from relatively small power plants, there have been considerable efforts in the area of fuel cells wherein the energy generated by an oxidation-reduction chemical reaction at spaced electrodes is directly converted into electrical energy to operate in an external circuit between the electrodes those devices which provide a load. Although some fuel cells have been produced which utilize relatively impure hydrogen or other oxidizable fuels, generally pure hydrogen has been recognized as the preferred fuel and its coreactant has generally been oxygen or oxygen in air.

Although various techniques have been proposed for converting hydrocarbons and other hydrogen-containing carbonaceous feedstocks into hydrogen for use in such cells, generally primary emphasis has been placed upon catalystic conversion at relatively high temperatures; i.e. about 700° centigrade. Passage of the resultant gas stream through purifiers employing such means as palladium membranes which are selectively permeable to hydrogen has been employed to minimize the impurities which might contaminate the fuel cell electrolyte which is generally alkaline.

Recently it has been proposed to employ a system wherein the carbonaceous feedstock is admixed with water and initially passed through a low-temperature catalytic reformer to reform the higher molecular weight feedstock to a methane-rich stream which is subsequently passed through a high-temperature catalytic converter to produce hydrogen and carbon oxide products. Thereafter, the effluent stream from the converter which contains significant amounts of carbon monoxide is passed to a catalytic shift converter operated at relatively low temperatures wherein the carbon monoxide is converted to carbon dioxide and additional hydrogen. However, the several steps involved and the different heat requirements of the several steps present problems in minimizing the size of such equipment and in attaining a relatively high degree of thermal efficiency.

It is an object of the present invention to provide a novel apparatus for the catalytic conversion of a hydrogen-containing carbonaceous feedstock to hydrogen wherein there is provided a relatively high degree of thermal efficiency and which is adapted to relatively compact construction for producing a stream of high purity hydrogen.

It is also an object of the present invention to provide such apparatus which is relatively long-lived and operable with a relative minimum of difficulty.

Another object of the present invention is to provide such apparatus wherein the sensible heat of the reaction products and heating fluids are utilized to a very high degree of efficiency so as to minimize external fuel requirements of the system.

Still another object is to provide a novel conversion and boiling apparatus for catalytically converting the carbonaceous feedstock and heating the feedstream to the desired inlet temperature.

Yet another object is to provide a novel shift conversion and hydrogen purification apparatus which efficiently employs the heat from the exothermic shift conversion reaction.

A specific object is to provide such an apparatus having a high degree of portability, rugged construction, relative simplicity of design and ease of operation which lends itself to field usage as a generator of hydrogen for a fuel cell apparatus.

SUMMARY OF THE INVENTION

It has now been found that the foregoing and related objects and advantages may be readily attained in apparatus having a boiler with a heat exchanger therein for heating a mixture of water and a hydrogen-containing feedstock by means of a second fluid. The apparatus also has a prereactor and a primary reactor both containing catalysts therein, and a burner about the primary reactor is provided for heating the reactor and the catalyst therein.

A conduit extends from the exit end of the reactor for flow of reaction products through the prereactor countercurrent to the flow of the mixture of water and feedstock therethrough, and the conduit is in heat exchange relationship with the catalyst in the prereactor. Another conduit for the combustion gases from the burner provides the second fluid in the heat exchanger of the boiler to heat the mixture of water and feedstock. A shift conversion reactor with a catalyst therein for converting carbon monoxide to carbon dioxide in the presence of water and a hydrogen purifier having a membrane therein selectively permeable to hydrogen complete the primary elements of apparatus. The hydrogen purifier has an outlet for waste gases and an inlet for the gas stream from the first mentioned conduit which also passes through the shift conversion reactor, the inlet and the outlet being adjacent opposite ends thereof and on one side of the membrane. The purifier also has an outlet for substantially pure hydrogen on the other side of the membrane. Conduits extend between the boiler and the inlet of the prereactor, between the prereactor and the primary reactor and between the shift conversion reactor and the hydrogen purifier. The purifier is disposed so as to obtain heat from at least one of the catalytic devices and thereby maintain the membrane thereof at a desirable operating temperature.

In operation of the apparatus, a mixture of a hydrogen-containing carbonaceous feedstock is mixed with water and passed through the boiler where it is heated to elevate the temperature thereof to about 205 to 510° centigrade. It then passes through a first bed of a dehydrogenation catalyst in the prereactor operated at an outlet temperature of about 370 to 650° centigrade to react substantially all of said feedstock to produce a methane-rich stream. The stream from the first catalyst bed in the prereactor is then passed through an additional bed of dehydrogenation catalyst in the primary reactor operated at an outlet temperature of 700 to 990° centigrade to effect conversion of substantially all the methane in the stream to carbon oxide products and hydrogen. The stream from the primary reactor is passed through the conduit in heat exchange contact with the first bed of the prereactor in countercurrent flow to the mixture passing therethrough to establish a thermal decline from the outlet to the inlet end thereof and to decrease the temperature of the stream.

The stream which is now at a decreased temperature is then passed through a bed of a shift conversion catalyst in the shift conversion reactor at a temperature of 200 to 480° centigrade to convert substantially all of the carbon monoxide in the stream to carbon dioxide. The stream from the shift conversion reactor is then passed through the hydrogen purifier in surface contact with one surface of the membrane selectively permeable to hydrogen so that the major portion of hydrogen in the stream diffuses through the membrane and substantially pure hydrogen is collected from the other surface of the membrane. The waste gas from the purifier is then burned in the burner about the primary reactor containing the additional catalyst bed so as to impart the desired heat thereto and the combustion gases from the burning of the waste gas are passed in heat exchange relationship with the mixture in the boiler so as to impart the desired degree of heat thereto.

BRIEF DESCRIPTION OF THE DRAWINGS

FIG. 5 is a sectional view thereof along the line 5—5 of FIG. 4;

FIG. 6 is a cross-sectional view thereof along the line 6—6 of FIG. 5;

FIG. 9 is a cross-sectional view thereof along the line 9—9 of FIG. 5;

FIG. 10 is a sectional view of another apparatus embodying the present invention utilizing a different construction for the shift converter-purifier subassembly and a different construction for the primary burner;

FIG. 11 is a sectional view to a greatly enlarged scale of the vortex-injector burner utilized in the embodiment of FIG. 10;

FIG. 12 is a sectional view to a greatly enlarged scale of an alternate embodiment of start-up burner for use with a liquid feedstock;

FIG. 13 is a partially diagrammatical plan view of another apparatus embodying the present invention; and FIG. 14 is a partially diagrammatical, sectional elevational view of the embodiment of FIG. 13.

DETAILED DESCRIPTION OF THE ILLUSTRATED EMBODIMENTS

Figure 1:
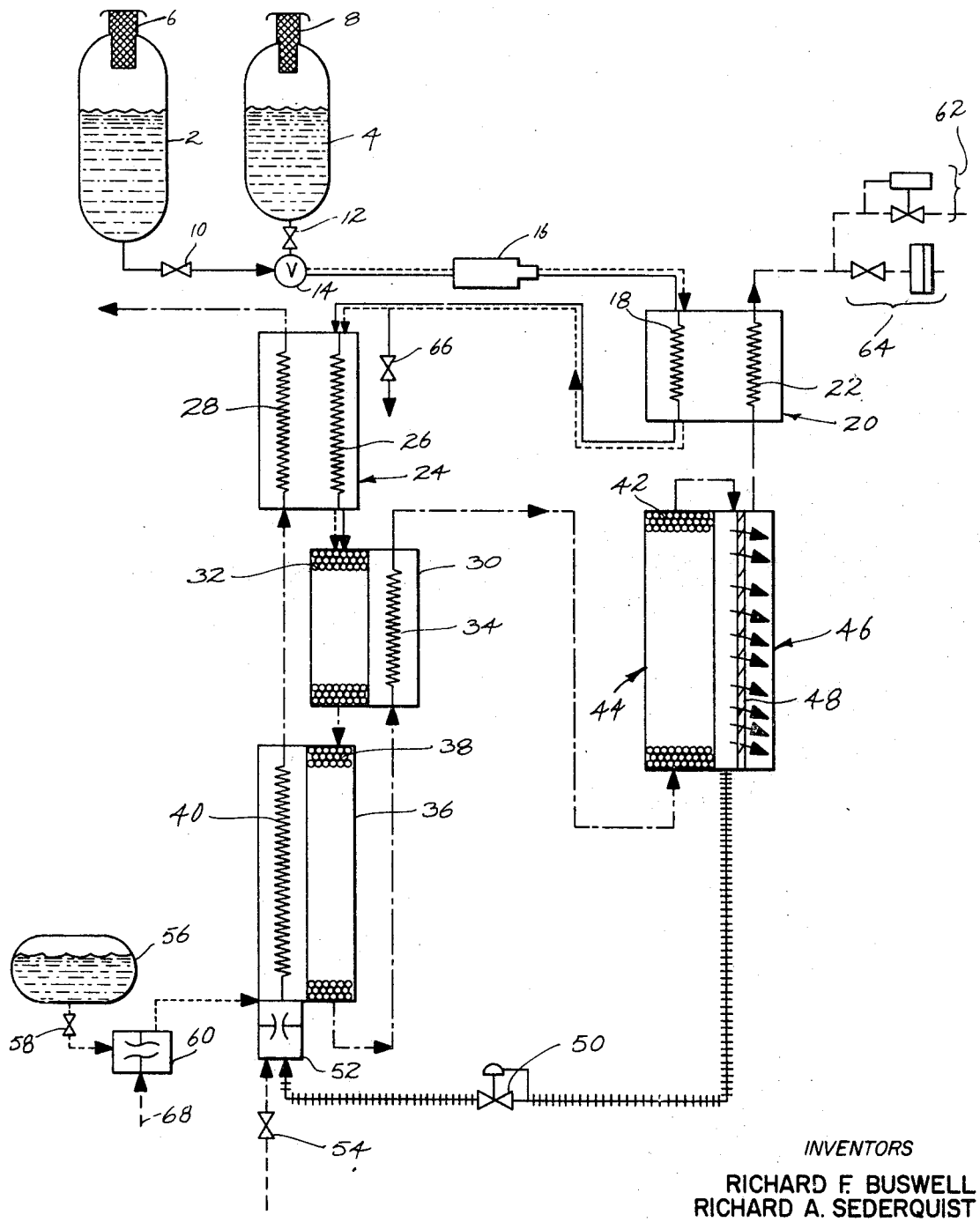
FIG. 1 is a diagrammatic representation of a process and apparatus embodying the present invention.

Referring now in detail to the attached drawings, FIG. 1 diagrammatically illustrates the process and apparatus of the present invention. A hydrocarbonaceous feedstock tank 2 and water tank 4 are both desirably provided with filter caps 6, 8. Feed lines having individual valves 10, 12 therein communicate with a proportioning valve 14 which blends the two streams in a predetermined ratio. A process pump 16 forces the blended stream through the tubing 18 of the feed preheater generally designated by the numeral 20 wherein the temperature thereof is raised by heat imparted from the tubing 22.

The feed stream is then passed into a boiler generally designated by the numeral 24 wherein it is heated in the tubing 26 by heat supplied through fluid in the tubing 28 to a temperature on the order of 205 to 510° centigrade. The feed stream is then passed into the prereactor 30 containing dehydrogenation catalyst 32 which is heated by fluid passing through the tubing 34 to a temperature of about 370 to 650° centigrade and wherein initial conversion of the feedstock occurs to produce methane, hydrogen and carbon oxide products.

This stream then passes into the primary reactor 36 and is reacted further by the dehydrogenation catalyst 38 to form hydrogen and carbon oxide products from the methane therein. The catalyst 38 is heated to a temperature of about 700 to 990° centigrade by the burner 40. The stream from the recator 36 is passed through the tubing 34 of the prereactor 30 in countercurrent flow to the feed stream so as to impart heat to the catalyst at a thermal gradient from the outlet to the inlet.

After the stream has passed through the prereactor 30, its temperature has been reduced and it is then passed through a bed of catalyst 42 in the shift converter generally designated by the numeral 44 wherein the carbon monoxide reacts with water in the stream to produce additional hydrogen and carbon dioxide. As shown, the exothermic shift converter 44 is coupled with the hydrogen purifier generally designated by the numeral 46 so as to impart heat thereto, and the gas stream from the converter 44 is passed in contact with one surface of a membrane 48 selectively permeable to hydrogen which diffuses to the opposite surface thereof and is collected therefrom.

The residual gases from the purifier 46 which include some hydrocarbons and carbon monoxide are passed through the pressure regulating valve 50 wherein the pressure thereof is decreased and thence into the air ejector 52 wherein air passed by the valve 54 is aspirated thereinto. The air-gas mixture is then burned in the burner 40 to supply the heat for the primary reactor 36 with the hot burner gases then passing about the tubing 28 of the boiler 24 wherein the feed stream is heated and finally being vented to the atmosphere.

To provide the initial heat for the reactor 36 during startup of the apparatus, fuel from the tank 56 is passed through the valve 58 into the startup burner 60 wherein it is burned with air from the line 68. The hot combustion gases from the burner 60 are then passed into the primary reactor to impart heat thereto and also serve to ignite the gas stream from the purifier 46 which will initially be very rich in methane until the primary reactor 36 reaches operating temperature. The startup burner 60 is shut off at this point.

The purified hydrogen passing through the membrane 48 is passed through the tubing 22 of the fuel preheater 20 wherein it imparts heat to the feed stream while being cooled before it reaches the hydrogen pressure relief valve 62 and the hydrogen pressure regulating valve 64 after which it may be passed directly to a fuel cell (not shown) or to a surge tank (not shown).

At shutdown, the bleed valve 66 at the inlet of the boiler 24 may be opened after turning off the pump 16 which automatically closes the system pressure control valve 50. The opening of the bleed valve 66 allows the reaction gases to flow back through the system and to be vented.

Figure 3:
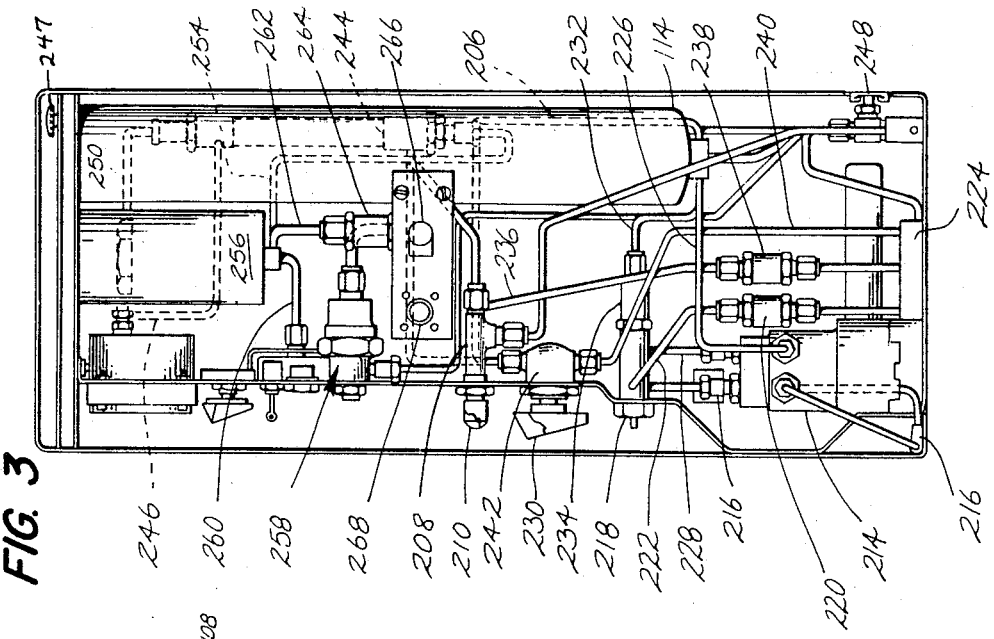
FIG. 3 is a side elevational view of the interior of the apparatus of FIG. 2 showing internal construction.
Figure 2:
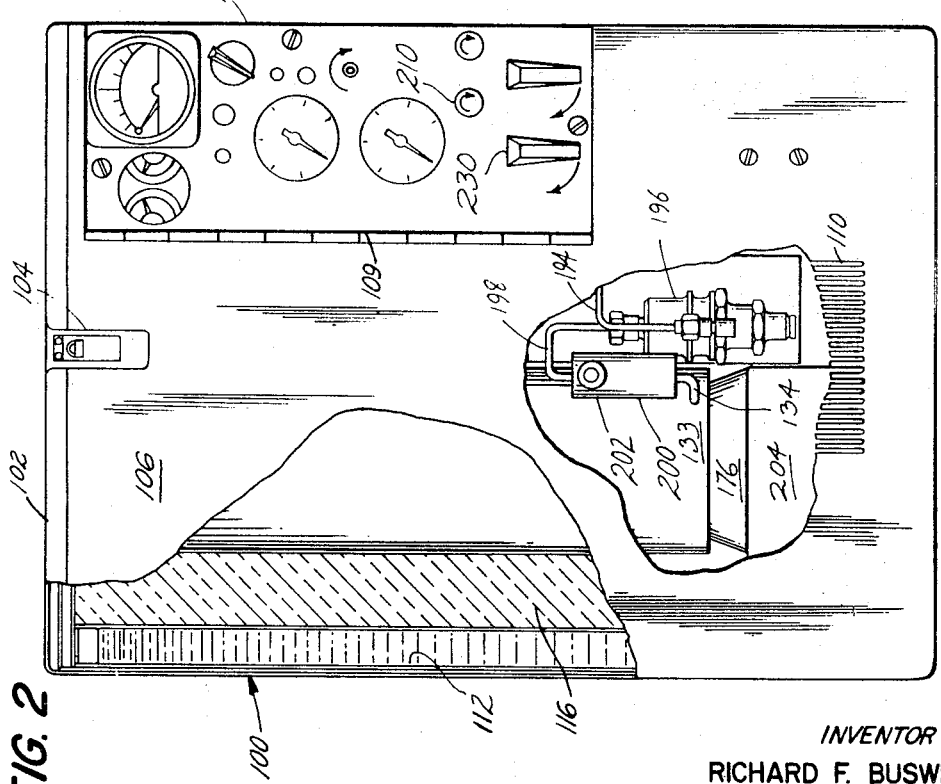
FIG. 2 is a front elevational view of an apparatus embodying the present invention with portions of the housing and interior construction broken away to reveal internal construction.

Referring now to the apparatus specifically illustrated in FIGS. 2 and 3 of the attached drawings, the conversion apparatus is conveniently received within a housing generally designated by the numeral 100 having a top cover 102 secured by the latch 104. The front wall 106 has mounted therein an instrument panel board generally designated by the numeral 108 with switches and gauges to be described in detail hereinafter. A cover plate (not shown) is mounted on the hinged 109 to cover the panel 108 and the front wall 106 is also provided with a grill 110. Within the housing 100 are provided a water tank 112 and a fuel tank 114.

Seated within the housing 100 and insulated therefrom by the insulating material 116 is a converter-purifier assembly which is illustrated in detail separately in FIGS. 4–9. Referring first to FIG. 5, the outer, capped tubular member 118 has therein a dehydrogenation catalyst 122 only partly shown but extending to the top of the outer tubular member 118. Supported and located by the wing elements 123 is an inner, capped tubular member 124 with perforations 126 in its bottom end which is disposed below the wing elements 123 but above the bottom of the outer tubular member 118. A coiled tube 128 extends from the interior of the inner tubular member 124 to the upper end of the outer tubular member 118 where it passes through the wall thereof and terminates in a fitting 130. An inlet 131 is provided adjacent the upper end of the outer tubular member 118 to feed in a gaseous stream of hydrocarbon and water which then passes downwardly through the catalyst 122. The stream then passes through the wing elements and upwardly through the inner tubular member 124 and the coiled tube 128 wherein it imparts heat to the catalyst 122 thereabout to establish a thermal gradient therein as it loses its heat on its way to exit from the outer tubular member 118.

Figure 7:
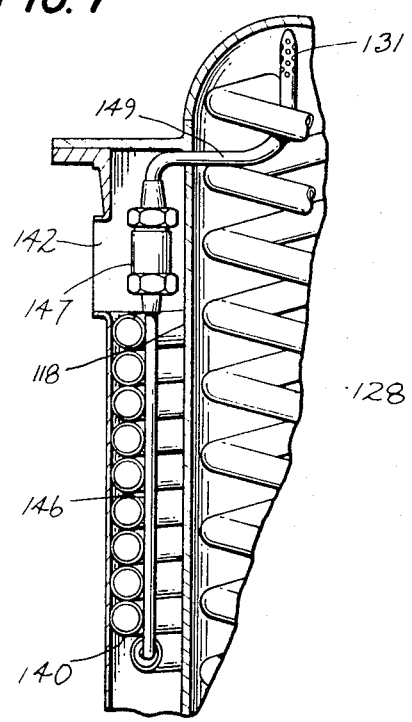
FIG. 7 is a fragmentary sectional view thereof along the line 7—7 of FIG. 4.

The lower portion of the outer tubular member 118 is directly heated by a fuel mixture burned in the burner assembly designated generally by the numeral 133. Within the casing 135 of the burner assembly is a generally cylindrical porous burner member 132 of refractory material conveniently fabricated from a mat of zirconia fibers and which is spaced from the tubular member 118. Above the burner assembly 133 is a cylindrical member 136 and the hot combustion gases are confined between the outer tubular member 118 and the shell 138 so as to pass upwardly in contact with the outer surface of the tubular member 118 and about the coiled boiler tube 140 disposed therebetween until vented through the outlet 142. A mixture of hydrocarbon and water fed to the boiler tube 140 at the fitting 144 is thus heated to a relatively high temperature by the combustion gases from the burner 132 which also serve to impart heat to and establish the thermal gradient in the upper portion of the tubular member 118. The heated stream from the boiler tube 140 is then conducted to the interior of the tubular member 118 by the feed conduit 146 which terminates in the fitting 147 and the tube 149, the end of which provides the feed inlet 131, as best seen in FIG. 7.

The reacted stream is carried from the fitting 130 by the tubing 148 which coils about the exterior of the generally cylindrical shift reactor casing 150 so as to impart heat thereto while itself cooling prior to its passage into the shift reaction converter chamber 153 defined between the shift reactor casing 150 and the generally cylindrical purifier casing 152. Catalyst 154 is disposed therein and the carbon monoxide in the stream reacts with the water therein under the influence of the catalyst to produce additional hydrogen and carbon dioxide. Since the shift conversion is exothermic and occurs about the purifier casing 152, heat is imparted thereto. As is shown, a plug 156 is provided for access to the catalyst 154.

The wall of the purifier casing 152 is provided with perforations 158 adjacent the upper end thereof so that the gas entering at the bottom of the shift converter chamber 153 passes therethrough in contact with the catalyst 154 and thence into the purifier casing 152. At the upper ends of the casings 150, 152 is a cylindrical end piece 160 which has mounted therein a purifier tube bundle assembly generally designated by the numberal 162. The assembly 162 has a cap element 164 with a fitting 166 and carries a tube header 168 at its lower end in which is supported a multiplicity of hollow tubes 170. As can be seen, the tubes 170 are sealed at their lower end and open into the chamber 172 in the cap element 164. The tubes 170 are fabricated from a metal selectively permeable to hydrogen such as a palladium-silver alloy so that the hydrogen in the gaseous stream entering through the perforations 158 is extracted therefrom and is carried to the chamber 172 and thence outwardly through the fitting 166. The remaining gases in the stream are exhausted through the outlet 174.

Figure 4:
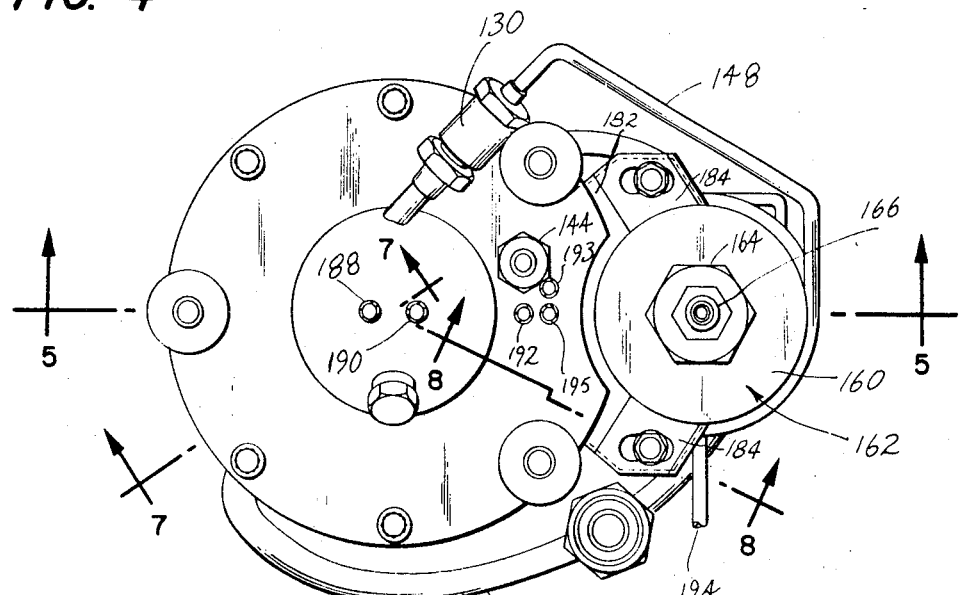
FIG. 4 is a top plan view of the reactor-shift convertor subassembly of the conversion apparatus illustrated in FIGS. 2 and 3.

As best seen in FIG. 5, the shell 138 and burner assembly 133 are supported in the apparatus housing 100 above a slide member 176, which is insulated from the combustion gases by the insulating element 178. The slide member may be slid from under the shell 138 to allow heat and gases from a start-up burner 204 (shown in FIG. 2) which may conveniently be of a Coleman type, to supply heat to the bed of catalyst 122. The slide member 176 also contains insulating material 180. Thus, the assembly may be supported within the housing 100. At the upper end, the shell 138 has a mounting flange 182 on which are mounted flanges 184 on the end piece 160 of the shift reactor-purifier as is best seen in FIGS. 4 and 8.

Figure 8:
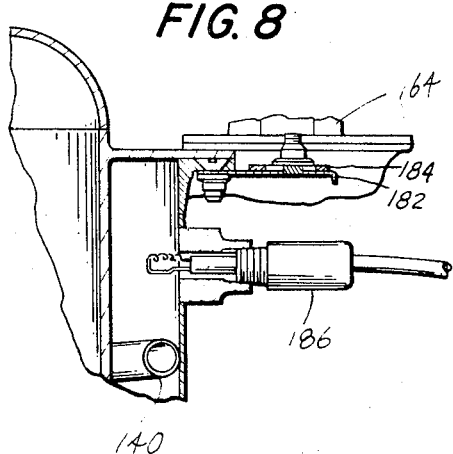
FIG. 8 is a fragmentary sectional view thereof along the line 8—8 of FIG. 4.

As also seen in FIG. 8, an igniter 186 is provided in the shell 138 and operable in the spacing bewteen the shell 138 and outer tubular member 118. Thermocouples 188, 190, 192, 193 and 195 are provided for determining the temperatures in the reactor, reactor wall and boiler exit.

Referring now again to FIGS. 2 and 3, the various conduits and additional elements of the apparatus are therein illustrated. The waste gas from the outlet 174 in the purifier casing 152 is carried by the conduit 194 to the back pressure regulator valve 196 and from the conduit 198 to the air ejector 200 wherein it is mixed with air coming through the air inlet 202. The air-waste gas mixture is then carried by the conduit 134 to the burner assembly 133. For initially supplying heat to the reactor assembly during start-up, a start-up burner 204, conveniently of the Coleman type, is disposed underneath the slide member 176 and obtains its fuel through the conduit 206 from the fuel tank 114 through the start-up burner fuel valve 208 which may be actuated by the switch 210.

In operation of this embodiment apparatus, water from the tank 112 is fed through the pump 214, fittings 216 and through the pressure switch 218. A water check valve 220 is provided in the conduit 222 prior to the water-mixing manifold 224.

Fuel for operation of the apparatus is obtained from the fuel tank 114 through the fuel conduit 226 and the pump 214. A fuel shut-off valve (not shown) is provided in the conduit 228, the handle of which may be seen bearing the numeral 230. If the fuel shut-off valve is closed, the fuel may be bled back to the tank through a conduit 232 through the fuel relief valve 234. During normal operation when the fuel shut-off valve is open, the fuel passes through the conduit 236 and the fuel check valve 238 to the water-fuel mixing manifold 224 wherein the two components are admixed. The mixture then passes through a conduit 240 and the system shut-off valve 242 into an outer annular spacing of the preheater 244 and then passes through the conduit 246 to the boiler tube 140 seen in FIG. 5. A hand pump 247 is utilized to supply the initial operating pressure to the apparatus.

On shutdown, the system subsequent to the water-fuel mixing manifold 224 may be back-purged through the shutdown bleed valve 248. The drain valves (not shown) may also be used to empty the tanks if so desired.

Hydrogen from the purifier fitting 166 passes through the conduit 250 to an inner tube in the feed preheater 244 where it is in heat exchange relationship with the feed mixture passing thereabout so as to impart heat thereto while simultaneously losing a portion of its own heat. From the heat preheater, the hydrogen passes through the conduit 254 to the accumulator tank 256. The hydrogen pressure in the system is controlled by the hydrogen pressure relief valve generally designated by the numeral 258 which is coupled to the accumulator tank by the conduit 260.

Hydrogen for operation of the fuel cell passes through the conduit 262 and fittings 264 to a hydrogen manifold 266 which is connected to the fuel cell through fittings (not shown).

Power to operate the pump and various control devices is supplied from the fuel cell itself to the power inlet 268. The various switches and gauges of the apparatus are generally schematically represented in the control panel in FIG. 2 of the drawings.

Referring now to the embodiment of FIGS. 10 and 11 of the attached drawings, the components are generally similar to those in the preceding embodiment of FIGS. 2–9 with the primary differences being in the construction of the shift converter and purifier, and in the nature of the primary burner for the primary reactor. Accordingly, not all details of construction are illustrated herein.

The subassembly housing for the principal operating components generally designated by the numeral 400 is provided with insulation 402 about its walls to provide a common heat enclosure and contains the converter-purifier assembly generally designated by the numeral 404 and having a generally cylindrical, tubular shell 406 with a bottom wall 408 and top cap 410. Supported coaxially within the tubular shell 406 is a generally cylindrical tubular core member 412 which has its bottom end sealed against the bottom wall 408 and has a top wall 414 with a coaxial seating recess 416 therein receiving a locating pin 418 on the tube header 420 which seats coaxially on the end of the tubular shell 406. A multiplicity of hollow tubes 422 are secured in the header 420 and extend in the annular space about the core member 412. The tubes 422 are fabricated of a metal selectively permeable to hydogen and are closed at their lower ends and open at their upper ends into the chamber defined between the header 420 and top cap 410.

The tubular core member 412 contains a shift conversion catalyst 424 (only partially illustrated) and receives the gaseous stream through the coupling 426. After the gaseous stream has passed upwardly through the catalyst 424, it is discharged from the core member 412 through apertures (not shown) in the top wall 414 and passes downwardly into the annular space thereabout in contact with the purifier tubes 422 so that a substantial proportion of the hydrogen therein diffuses through the walls thereof and passes upwardly into the chamber adjacent the top cap 410 and is discharged through the conduit 428 for use or collection in auxiliary apparatus (not shown). The waste gases which pass downwardly about the purifier tubes 422 are discharged from the purifier-converter assembly 404 through the conduit 430.

Within the cavity of the subassembly housing 400 is also located the reactor-burner assembly generally designated by the numeral 432 which has a generally tubular sleeve 434 thereabout provided with an insulating liner 436 adjacent its lower end. Supported coaxially within the sleeve is the reactor shell 438 which in turn coaxially receives the heat exchanger coil 440 adjacent its upper end and the inner tubular member 442 which is spaced slightly above its bottom wall. Within the reactor shell 438 about the heat exchanger coil 440 and the inner tubular member 442 is catalyst 444 (only partially illustrated). The reactor shell is supported by the threaded member 443 and the radial elements 445. Extending about the upper portion of the reactor shell 438 is a heat exchanger coil 446 which functions as the boiler and a conduit 448 extends from the lower end thereof and opens into the top of the reactor shell 438. The mixture of water and feedstock is introduced into the upper end of the boiler coil 446 through the conduit 450 and is heated by hot gases flowing upwardly about the reactor shell 438. As the heated mixture passes downwardly through the bed of catalyst 444, it is heated by the heat exchanger coil 440 in the upper portion and by hot burner gases in contact with the lower portion of the shell 438. The converted mixture then passes upwardly into the inner tubular member 442, thence through the heat exchanger coil 440 to provide heat to the catalyst bed 444 and thence through the conduit 452 to the coupling 426 of the converter-purifier assembly 404.

During operation of this embodiment, waste gas from the purifier is carried by the conduit 430 to the injector burner generally designated by the numeral 454 wherein it is burned in admixture with air to provide heat to the reactor shell 438. The hot combustion gases swirl upwardly about the boiler coil 446 to heat the incoming mixture of water and feedstock. The hot burner gases then pass through the opening 456 in the sleeve 434 and downwardly about the shell 406 of the purifier-converter assembly 404, and finally out of the subassembly housing 400 through the vent 458. In order to provide the heat necessary for initial operation, this embodiment employs a startup burner generally designated by the numeral 460.

Turning now to FIG. 11, the injector vortex burner 454 of the embodiment of FIG. 10 is illustrated in detail. The body member 462 has a bore 464 which extends through the greater portion of the length thereof and which is internally threaded at its open end. A smaller threaded bore 466 extends coaxially through the end wall 468 of the body member and seats the primary injector feed tube 470 which is held in position by the nut 472. Air is introduced radially into the bore 464 through the inlet tube 474, and a pressure tap 476 may be desirably provided for control measurement. A mixing tube 478 with an externally threaded end portion is threaded into the end of the bore 464 and extends secantally into the burner cavity of the sleeve 434 which is provided with the insulating liner 436. Since the length of the mixing tube 478 is relatively short, only partial premixing of the gases in the injector burner 454 occurs and flashback thereinto is substantially avoided. The high velocity of the pressurized waste gases from the purifier assembly 404 brought to the feed tube 470 by the conduit 430 induces air flow through the inlet tube 474, and the high velocity, partially premixed air and waste gas entering the burner cavity secantally swirl about the cavity and the burner as they are ignited and burn. Ignition occurs as the mixture contacts previously burning fuel or impinges upon surfaces which have been heated by prior combustion.

In FIG. 12, there is illustrated a pot-type burner for use with liquid fuels during start-up of the apparatus. The bottom wall 480 of the sleeve 434 of the reactor-burner assembly 432 has mounted therein a cup-like or pot-like member 482 which has an inlet tube 484 coaxially feeding thereinto feedstock from the fuel source (not shown). An air conduit 486 supplies primary air for initial combustion of the feedstock to the side of the pot-like member 484 through the tube 488 and secondary for combustion to the burner cavity through the tube 490.

A wick of absorbent material 492 is supported on the stem 494, and a spark plug 496 is mounted on the side of the pot-like member 482 to initiate combustion of the feedstock introduced thereinto. After the unit is in operation and at temperature, the flow of feedstock to the pot-like member 482 is discontinued.

It will be appreciated that, in this embodiment, the exothermic shift conversion reaction in the catalyst 424 of the purifier-converter assembly 404 provides heat to the purifier tubes 422. In addition, hot burner gases passing downwardly about the shell 406 provide heat to the purifier tubes 422.

Turning now to the embodiment of FIGS. 13 and 14, a still different arrangement for the purifier tubes and shift converter is illustrated therein. The housing generally designated by the numeral 516 has a cavity 514 enclosed by the insulating material 518 and has portions 520, 522 and 524 for other components and controls (not shown). The reactor-burner assembly 432 is generally similar to that of the embodiment of FIG. 10 so that the same reference numerals are used in connection therewith. In this embodiment, the gas stream for the heat exchange coil 440 passing through the conduit 452 is now directed into one end of the tubular member 500 containing the shift conversion catalyst 502. The product stream then passes from the other end thereof through the conduit 504 into the first of a series of purifiers each generally designated by the numeral 506 and comprising a shell 508 containing a multiplicity of tubes (not shown) of a metal selectively permeable to hydrogen. Conduits 510 extend between the several shells 508 of the purifiers 506, and the hydrogen gas abstracted by the purifier tubes is removed from the purifiers 506 through the conduit 512.

In this embodiment, it can be seen that the tubular member 500 of the shift converter, the purifiers 506 and the reactor-burner assembly 432 are located in a common cavity enclosed by the insulation 514 in the housing 516. Thus, heat from the exothermic reactions and from the burner gases maintains the purifiers 506 at a desirable operating temperature.

In each of the several illustrated embodiments hereinbefore described, it can be seen that the heat generated by the exothermic reactions and by burning feedstock initially or waste gas during operation is fully utilized to heat the catalyst in the prereactor and reactor, the incoming mixture and the purifier tubes. The apparatus operates highly efficiently and with a minimum of difficulty.

In the copending application of Richard A. Sederquist, filed Aug. 4, 1965, Ser. No. 480,528, now U.S. Pat. 3,442,618, granted May 6, 1969, entitled Method and Apparatus for Producing Hydrogen From Hydrogen-Containing Feedstocks, there is explained in detail the method for predetermining a thermal incline in a bed of dehydrogenation catalyst operated at relatively low temperature whereby the stream of hydrogen-containing carbonaceous feedstock and water may be reacted so as to produce substantially entirely methane, hydrogen and carbon oxide products while substantially avoiding the carbon forming reaction:

$$2 CO \leftrightarrow CO_2 + C$$
$$CH_4 \leftrightarrow C + 2H_2$$
$$CO_2 + 2H_2 \leftrightarrow C + 2H_2O$$
$$CO + H_2 \leftrightarrow C + H_2O$$

Generally, the gaseous stream of the feedstock and water is heated to a temperature of about 205 to 510° centigrade. Thereafter it is passed through a bed of dehydrogenation catalyst which has been heated so as to provide a thermal incline from the inlet end to the outlet end thereof with the temperature at the outlet end being about 370 to 650° centigrade. The thermal incline is selected with respect to the feedstock catalyst and conditions of operation to provide an increasing fraction of fuel reacted with increasing temperature along the incline and to avoid substantially the aforementioned carbon forming reactions.

More particularly, it was discovered that by closely controlling the fraction of fuel at a given temperature for a particular feedstock the carbon forming reactions heretofore described may be substantially, if not completely, eliminated. As will be readily appreciated, the fraction of fuel reacted will increase with temperature. The effect of the fraction of fuel reacted upon the carbon forming reaction:

$$CH_4 \leftrightarrow C + 2H_2$$

may be determined analytically to establish the points below which the methan cracking reaction will occur at a given temperature. Similarly the effect o the fraction of fuel reaction based upon the carbon forming reaction:

$$CO_2 + 2H \leftrightarrow C + 2H_2O$$

may be calculated. Above this plot the composition of the product is such that carbon will be produced.

These two curves may be graphically presented to define a carbon-free region. With such a graphic presentation, it is relatively easy to construct a model for determining the thermal incline in a prereactor to convert substantially all the hydrogen-containing carbonaceous feedstock to a methane-rich stream.

Whereas maintaining the dehydrogenation catalyst within a range closely approximating an average temperature or at a constant temperature as opposed to pronounced thermal incline the reaction path will cross the upper carbon forming boundary, i.e., that at which the carbon dioxide and carbon monoxide reaction take place, thus producing elemental carbon which will tend to deteriorate the activity of the catalyst. To avoid this effect, a thermal incline is established in a low temperature converter or prereactor whereby the temperature is increased as the fraction of fuel reacted inceases while at the same time staying below the curve (or curves) for the carbon oxide reactions and above the curve for the methane cracking reaction.

The prereactor portion or first catalyst bed generally should have an inlet temperature of about 205 to 510° centigrade and preferably about 370 to 510° centigrade. The outlet of the first catalyst bed, or prereactor, is maintained at a temperature of about 370 to 650° centigrade and preferably 535 to 625° centigrade. The inlet temperature of the second catalyst bed, or reactor portion, is 370 to 650° centigrade and preferably 535 to 625° centigrade. The outlet temperature of the second catalyst bed, or reactor portion, is 700 to 990° centigrade and preferably 700 to 815° centigrade.

In order to cause the hydrogen to diffuse through the permeable membrane in the purifier it is necessary to maintain pressures in the system of at least about 100 pounds per square inch absolute and they may range up to about 400 pounds per square inch absolute. Preferably the pressure is maintained on the order of 175 to 225 pounds per square inch absolute.

The temperature within the shift conversion reaction may range from about 205 to 455° centigrade and preferably is about 300 to 330° centigrade. The hydrogen permeable membranes in the hydrogen purifier are maintained at a temperature of about 205 to 455° centigrade and preferably at about 300 to 330° centigrade.

Within the feedstock preheater, it is generally desirable to elevate the temperature of the mixture from ambient temperature to about 60 to 100° centigrade. The boiler is intended to raise the temperature of the feedstock mixture passing therethrough to about 205 to 510° centigrade and preferably about 370 to 510° centigrade.

The space velocity of the combined first and second beds of catalyst, or prereactor and primary reactor, will depend upon the activity of the catalyst and the temperatures and pressures employed in the system. Generally, they may vary between about 500 and 5,000 hours$^{-1}$ and preferably about 1,500 to 3,500 hours$^{-1}$.

The space velocity in the shift conversion catalyst may range from 2,000 to 8,000 hours$^{-1}$ and is preferably about 3,500 to 4,500 hours$^{-1}$.

Various hydrocarbonaceous fuels may be employed in the present process including paraffins, olefins, aromatics and alcohols containing about 5 to 16 carbon atoms. The preferred fuels are saturated hydrocarbons containing 6 to 10 carbon atoms and combinations thereof, either alone or with relatively small amounts of unsaturated hydrocarbons. Conveniently, hexane, heptane, octane, nonane, decane, and mixtures thereof, may be employed.

Because of the favorable equilibrium factors in the present invention, a relatively low steam to carbon molar ratio may be employed i.e., approaching the stoichiometric ratio of 2.0:1.0. Generally, the ratios employed are about 2.0–5.0:1. The term "dehydrogenation catalyst" as used herein is intended to refer to any of the conventional steam reforming catalysts such as nickel, cobalt and platinum.

It can be seen from the foregoing detailed description that the prereaction or low-temperature reaction of the feedstock and steam to product a methane-rich stream may be provided within the initial portion of a single reactor and catalyst bed with the high-temperature primary reaction occurring at the final portion thereof. Generally the predetermined operating conditions, particularly when employing fresh catalyst, exhibit a tendency toward carbon formation at the beginning of operation due to the taking place of most of the prereaction near the inlet or at the very beginning of the catalyst bed as a result of the high activity of the catalyst. As will be appreciated, the carbon formation in such a situation occurs by reason of the fact that the desired thermal incline for increasing fraction of fuel reaction is substantially obviated by the high activity of the catalyst. However, it has been shown both analytically and experimentally that the system compensates for the problem by adjusting through catalyst deterioration as a result of carbon formation so that more of the length of the catalyst bed is required for completion of the desired prereaction. Thus, an adjusted steady state is evolved which reliably indicates the required catalyst volume for a given hydrocarbon fuel and reactor design. It will be appreciated that this adjustment or compensation does not require decay or deterioration of the overall system and that only a finite amount of catalyst is involved. This factor has been readily proven in operation of prototype systems for over 500 hours without detection of carbon build-up within the catalyst.

Exemplary of the efficacy of the present invention is the following specific example:

EXAMPLE

To an apparatus constructed similarly to that illustrated in the attached drawings was fed a mixture of 0.309 pound per hour of a hydrocarbon fuel designed "JP-150," a Udex Raffinate manufactured by Texaco, and 1.074 pounds per hour of water. The JP-150 fuel has a hydrogen to carbon ratio of 0.180 and contains 1.8 percent olefins and 0.8 percent aromatics according to A.S.T.M. Test D-1319. Its viscosity at 100° Fahrenheit is 0.73 and its specific gravity (A.P.I.) is 63.8°. A distillation analysis on the Fahrenheit scale is as follows:

|  | Degrees |
|---|---|
| Initial boiling point | 240 |
| 10 percent | 267 |
| 20 percent | 270 |
| 50 percent | 284 |
| 90 percent | 306 |
| End point | 335 |

The catalyst employed in the tube providing the prereactor and primary reactors was "G-56" a proprietary nickel catalyst made by Girdler Catalyst Company. The catalyst was in the form of pellets ⅛ inch by ⅛ inch and the amount in the prereactor portion was 0.70 pound and the amount in the reactor portion was 0.50 pound. The weight of catalyst in the shift converter was 0.60 pound. The purifier tubes were fabricated from a palladium alloy containing 25 percent by weight of silver and with a wall thickness of 0.003 inch.

The apparatus was operated at a pressure of 200 pounds per square inch gauge. After a startup period of about thirty minutes in which the unit was brought up to temperature and proper operating cycle by the startup burner and combustion of the hydrocarbon-rich waste gas from the purifier, the apparatus was put on stream. Thermocouples recorded the following temperatures at the points indicated:

|  | Degrees Fahrenheit |
|---|---|
| Bottom end of boiler | 935 |
| Prereactor upper end | 790 |
| Primary reactor entrance | 1035 |
| Primary reactor midpoint | 1245 |
| Primary reactor bottom end | 1420 |
| Wall between converter and purifier (bottom end) | 720 |
| Wall between converter and purifier (upper end) | 500 |

Exiting from the apparatus was a pure hydrogen stream at the rate of 0.071 pound per hour indicating a high degree of conversion efficiency. The above prereactor and reactor temperatures closely approximate the design temperatures of 800° Fahrenheit at the prereactor upper end, 1100° Fahrenheit at the primary reactor entrance and 1400° Fahrenheit at the primary reactor bottom end. Thus, it can be seen that the method and apparatus of the present invention provide a high degree of thermal efficiency and patentability.

As will be readily appreciated from the foregoing detailed description and specific example, the method and apparatus of the present invention afford a relatively high degree of thermal efficiency which is adapted to relatively compact apparatus for producing a stream of highly pure hydrogen. The components have demonstrated long-lived operation with a relative minimum of difficulty and minimize external fuel requirements for the system. The sensible heat of the gaseous products is utilized to the greatest extent possible and simultaneously cools the gaseous stream for subsequent reactions. As can be appreciated, this minimization of requirements and relative simplicity of construction enables the design of a relatively compact assembly. In fact, the apparatus illustrated in FIGS. 2–9 of the attached drawings is shown at ⅓ scale of an apparatus actually utilized to produce hydrogen for a fuel cell designed to generate 500 watts. The system itself and the apparatus have been tested at length and found to operate efficiently and with such freedom from difficulty as to enable utilization under field conditions by relatively inexperienced operating personnel.

Having thus described the invention, we claim:

1. In an apparatus for providing substantially pure hydrogen from hydrogen-containing carbonaceous feedstocks, the combination comprising: a boiler having a heat exchanger therein for heating a mixture of water and feedstock by means of a second fluid; a prereactor having a dehydrogenation catalyst therein; a primary reactor having a dehydrogenation catalyst therein; a burner about said primary reactor for heating said reactor and said catalyst therein; a conduit from the exit end of said reactor for reaction products of the mixture of water and feedstock and extending through said prereactor countercurrent to the flow of the mixture therethrough, said conduit being in said heat exchange relationship with said catalyst in said prereactor; a conduit to said boiler for the combustion gases of said burner comprising the said second fluid for heating the mixture; a shift conversion reactor having a catalyst therein for converting carbon monoxide to carbon dioxide in the presence of water, said conduit for reaction products connecting to said shift conversion reactor; a hydrogen purifier having a membrane therein selectively permeable to hydrogen, an inlet for the gas stream passing through said shift conversion reactor and an outlet for waste gases, said inlet and said outlet being adjacent opposite ends thereof and on one side of said membrane, said purifier also having an outlet for substantially pure hydrogen on the other side of said membrane, said purifier being disposed adjacent said shift converter so as to obtain heat therefrom; and conduits between said boiler and the inlet of said prereactor for the mixture of feedstock and water, between said prereactor and primary reactor, and between said shift conversion reactor and hydrogen purifier.

2. The apparatus of claim 1 wherein said prereactor and primary reactor are portions of a single reaction vessel with said beds of catalyst being portions of a single continuous catalyst bed.

3. The apparatus of claim 1 wherein said shift conversion reactor is disposed in the center of said hydrogen purifier.

4. The apparatus of claim 1 wherein said hydrogen purifier is disposed in the center of said shift conversion reactor.

5. The apparatus of claim 1 wherein said hydrogen purifier is disposed in a common insulated cavity with said reactor and shift conversion reactor so as to obtain heat therefrom.

6. The apparatus of claim 1 wherein there is included a preheater having a heat exchanger therein for heating a mixture of water and feedstock by means of a second fluid; a conduit from said outlet for substantially pure hydrogen in said purifier to said preheater, the hydrogen from said purifier providing said second fluid in said preheater for heating the mixture; and a conduit from said preheater to said boiler for conducting the mixture thereto.

7. The apparatus of claim 1 wherein said hydrogen purifier has a multiplicity of hollow tubes providing said membrane with the cavity thereof connecting to said outlet for pure hydrogen.

8. The apparatus of claim 1 wherein a conduit extends between said waste gas outlet of said purifier to said burner for combustion of the waste gas therein.

9. In an apparatus for providing substantially pure hydrogen from hydrogen-containing carbonaceous feedstocks, the combination comprising: a casing member; a generally cylindrical reactor within said casing member and of smaller width so as to provide a spacing therebetween; a bed of dehydrogenation catalyst within said reactor; a tubular conduit opening adjacent one end of said reactor and catalyst bed for reaction products of catalytic conversion therein and extending therewithin to the other end of said reactor and outwardly thereof, said conduit being in heat exchange relationship with said catalyst at least adjacent said other end of said reactor, said reactor having an inlet for a mixture of a hydrogen-containing carbonaceous feedstock and water adjacent said other end of said reactor and catalyst bed to produce flow of said mixture through said bed counter-current to the flow of reaction products through said conduit; means in said spacing between said casing member and reactor adjacent one end thereof for heating said one end and said catalyst therein, the hot gases from said heating means passing through the spacing between said reactor and casing member to said other end; a tubular boiler element disposed within the spacing between said reactor and casing member adjacent said other end thereof, the gases from said heating means passing about said boiler element to heat a mixture of hydrogen-containing carbonaceous feedstock and water passing therethrough; a conduit from said boiler element to said inlet of said reactor; a shift conversion reactor having a catalyst therein for converting carbon monoxide to carbon dioxide in the presence of water; a hydrogen purifier having a membrane therein selectively permeable to hydrogen, an inlet for the gas stream passing through said shift conversion reactor and an outlet for waste gases, said inlet and said outlet being adjacent opposite ends thereof and on one side of said membrane, said purifier also having an outlet for substantially pure hydrogen on the other side of said membrane, said purifier being disposed adjacent said shift converter so as to obtain heat therefrom; and a conduit between said shift conversion reactor and hydrogen purifier.

10. The apparatus of claim 9 wherein said heating means comprises a burner for combusting a stream of fuel and air fed thereto and wherein said boiler element is a tube coiled about said reactor.

11. The apparatus of claim 9 wherein said shift conversion reactor is disposed in the center of said hydrogen purifier.

12. The apparatus of claim 9 wherein said hydrogen purifier is disposed in the center of said shift conversion reactor.

13. The apparatus of claim 9 wherein said hydrogen purifier is disposed in a common insulated cavity with said reactor and shift conversion reactor so as to obtain heat therefrom.

14. In an apparatus for providing hydrogen from hydrogen-containing carbonaceous feedstocks, the combination comprising: a casing member; a generally cylindrical reactor within said casing member and of smaller width so as to provide a spacing therebetween; a bed of dehydrogenation catalyst within said reactor; a tubular conduit opening adjacent one end of said reactor and catalyst bed for reaction products and extending through said reactor and bed to the other end of said reactor and outwardly thereof, said conduit being in heat exchange relationship with said catalyst at least adjacent said other end of said reactor, said reactor having an inlet for a mixture of a hydrogen-containing carbonaceous feedstock and water adjacent said other end of said reactor and catalyst bed to produce flow of said mixture through said bed countercurrent to the flow of reaction products through said conduit; means in said spacing between said casing member and reactor adjacent said one end thereof for heating said one end and said catalyst therein, hot gases from said heating means passing through the spacing between said reactor and casing member to said other end; a tubular boiler element disposed within the spacing between said reactor and casing member adjacent said other end thereof, the hot gases from said heating means passing about said boiler element to heat a mixture of hydrogen-containing carbonaceous feedstock and water passing therethrough; and a conduit from said boiler element to said inlet of said reactor.

15. The apparatus in accordance with claim 14 wherein said heating means comprises a burner for combusting a stream of fuel and air fed thereto.

16. The apparatus in accordance with claim 14 wherein said boiler element is a tube coiled about said reactor.

17. The apparatus in accordance with claim 14 wherein said tubular conduit in said reactor and catalyst bed is coiled adjacent said other end of said reactor to provide enhanced heat exchange with said catalyst bed.

18. In an apparatus for providing substantially pure hydrogen from hydrogen-containing carbonaceous feedstocks, the combination comprising: a casing member; a generally cylindrical reactor within said casing member and of smaller width so as to provide a spacing therebetween; a bed of dehydrogenation catalyst within said reactor; a tubular conduit opening adjacent one end of said reactor and catalyst bed for reaction products and extending therewithin to the other end of said reactor and outwardly thereof, said conduit having a coiled portion adjacent said other end of said reactor in heat exchange relationship with said catalyst therein, said reactor having an inlet for a mixture of a hydrogen-containing carbonaceous feedstock and water adjacent to said other end of said reactor and catalyst bed to produce flow of said mixture through said bed countercurrent to the flow of reaction products through said conduit; an annular burner in said spacing between said casing member and reactor adjacent one end thereof for heating said one end and said catalyst therein, the gases from said burner passing through the spacing between said reactor and casing member to said other end of said casing member and outwardly therethrough; a tubular boiler element of generally annular configuration disposed about said reactor within the spacing between said reactor and casing member adjacent said other end thereof, the gases from said heating means passing about said boiler tube to heat a mixture of hydrogen-containing carbonaceous feedstock and water passing therethrough; a conduit from said boiler element to said inlet of said reactor; an outer tubular casing member; an inner tubular casing member of generally cylindrical configuration within said outer casing member and of smaller width so as to provide a spacing therebetween, said inner casing providing a first cavity therein and said spacing providing a second cavity thereabout; a shift conversion catalyst in one of said cavities; a membrane selectively permeable to hydrogen in the other of said cavities, said casing member providing the cavity for said membrane having an opening therethrough adjacent one end thereof and to one side of said membrane for passage of a gas stream from the other of said cavities thereinto, the casing member providing the other of said cavities having an inlet for process gas with which said conduit in said reactor communicates; a conduit from said casing member providing the cavity for said membrane on the other side of said membrane for removing substantially pure hydrogen therefrom; a conduit on the casing member on said one side of said membrane adjacent the other end thereof for removing waste gases therefrom and communicating with said burner for burning the waste gases to provide heat, said conduit including means for introducing air into the waste gas; a preheater having a heat exchanger therein for heating a mixture of water and feedstock by means of a second fluid, said conduit from said purifier for substantially pure hydrogen extending to said heat exchanger in said preheater, the hydrogen from said purifier providing said second fluid in said preheater for heating the mixture; and a conduit from said preheater to the heat exchanger of said boiler for conducting the mixture thereto.

19. The apparatus of claim 18 wherein said shift conversion catalyst is disposed in the outer cavity between said inner and outer tubular members and discharging in said membrane is provided by a multiplicity of hollow tubes extending in said cavity within said inner tubular member and discharging into said conduit for pure hydrogen.

20. The apparatus of claim 18 wherein said shift conversion catalyst is disposed in the inner cavity provided within said inner tubular member and wherein said membrane is provided by a multiplicity of hollow tubes extending in said cavity provided by the spacing between said inner and outer tubular members and discharging into said conduit for pure hydrogen.

21. In an apparatus for providing substantially pure hydrogen from hydrogen-containing carbonaceous feedstocks, the combination comprising: a primary reactor containing a dehydrogenation catalyst; means for supplying a hydrogen containing carbonaceous feedstock to said primary reactor for conversion into a process gas containing hydrogen and carbon oxides; a first casing member of generally tubular configuration; a second casing member of generaly tubular configuration within said first casing member and of smaller width so as to provide a spacing therebetween, said second casing member providing a cavity therewithin and said spacing providing a cavity thereabout; a shift conversion catalyst in one of said cavities; a membrane selectively permeable to hydrogen in other of said cavities; a conduit between said cavity of said second casing member and said cavity of said first casing member for passage of a gas stream from the one cavity into the other cavity on one side of said membrane and adjacent one end thereof, said casing member providing said one cavity having an inlet for process gas; a conduit from said primary reactor to said inlet for conveying process gas thereto; a conduit from the casing member providing said second cavity on the other side of said membrane for removing substantially pure hydrogen; and a conduit from the casing member providing said second cavity adjacent the other end thereof and on said one side of said membrane for removing waste gases therefrom, said shift conversion catalyst being in heat exchange contact with the casing member between said one and said other cavities and providing heat thereto during operation of the apparatus as a result of the exothermic shift conversion reaction to maintain said membrane at an elevated temperature.

22. The apparatus of claim 21 wherein said membrane comprises a multiplicity of hollow tubes extending in said second cavity sealed at one end thereof and opening adjacent said conduit for removing substantially pure hydrogen.

23. The apparatus of claim 21 wherein said shift conversion catalyst is dispersed in the outer cavity between said inner and outer tubular casing members and wherein said membrane is provided by a multiplicity of hollow tubes extedning in said cavity within said inner tubular member and discharging into said conduit for pure hydrogen.

24. The apparatus of claim 21 wherein said shift conversion catalyst is disposed in the outer cavity between within said inner tubular member and wherein said membrane is provided by a multiplicity of hollow tubes extending in said cavity provided by the spacing between said inner and outer tubular members and discharging into said conduit for pure hydrogen.

References Cited
UNITED STATES PATENTS

| 2,319,508 | 5/1943 | Leprestre et al. | 23—288 X |
| 3,264,066 | 8/1966 | Quartulli et al. | 48—196 X |
| 3,278,268 | 10/1966 | Pfefferle | 23—288 X |
| 3,278,452 | 10/1966 | Vorum | 23—288 X |
| 3,350,176 | 10/1967 | Green et al. | 23—288 X |
| 3,397,961 | 8/1968 | Squires | 23—213 |
| 3,410,661 | 11/1968 | Taylor | 23—213 |

JOSEPH SCOVRONEK, Primary Examiner

U.S. Cl. X.R.

23—262, 281; 48—94, 196, 214; 55—158